(12) United States Patent
Welch et al.

(10) Patent No.: US 8,292,592 B2
(45) Date of Patent: Oct. 23, 2012

(54) NOSECONE BOLT ACCESS AND AERODYNAMIC LEAKAGE BAFFLE

(75) Inventors: David A. Welch, Quaker Hill, CT (US); Phillip Alexander, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1239 days.

(21) Appl. No.: 12/080,383

(22) Filed: Apr. 2, 2008

(65) Prior Publication Data

US 2010/0322782 A1 Dec. 23, 2010

(51) Int. Cl.
*B64C 11/14* (2006.01)
(52) U.S. Cl. .................................. 416/245 R; 415/201
(58) Field of Classification Search .................. 415/201, 415/118, 218.1, 219.1; 416/245 R, 245 A
See application file for complete search history.

(56) References Cited

U.S. PATENT DOCUMENTS

| | | | |
|---|---|---|---|
| 2,992,685 | A | 7/1961 | Madsen |
| 3,799,693 | A | 3/1974 | Hull |
| 3,990,814 | A | 11/1976 | Leone |
| 4,320,903 | A | 3/1982 | Ayache et al. |
| 4,393,650 | A | 7/1983 | Pool |
| 4,662,821 | A | 5/1987 | Kervistin et al. |
| 4,863,354 | A | 9/1989 | Asselin et al. |
| 4,883,407 | A | 11/1989 | Touze |
| 4,904,156 | A | 2/1990 | Touze |
| 5,226,788 | A | 7/1993 | Fledderjohn |
| 5,573,378 | A | 11/1996 | Barcza |
| 6,447,255 | B1 | 9/2002 | Bagnall et al. |
| 6,561,763 | B2 | 5/2003 | Breakwell |
| 6,942,462 | B2 | 9/2005 | Breakwell et al. |
| 7,249,463 | B2 | 7/2007 | Anderson et al. |
| 2008/0041842 | A1 | 2/2008 | Alexander et al. |

*Primary Examiner* — Dwayne J White
(74) *Attorney, Agent, or Firm* — Kinney & Lange, P.A.

(57) ABSTRACT

A device includes a resilient member having a first end for blocking an access hole and a second end for attachment to a support surface, an opening extending through the resilient member and located between the first and second ends, and a bolt connection location positioned at the second end of the resilient member. The first end of the resilient member blocks the access hole and can be deflected to provide tool access to the bolt connection location through the first opening.

20 Claims, 3 Drawing Sheets

NOSECONE BOLT ACCESS AND AERODYNAMIC LEAKAGE BAFFLE

STATEMENT OF GOVERNMENT INTEREST

The present invention was developed, at least in part, with government funding, under Contract No. N00019-02-C-3003 awarded by the United States Navy. The U.S. Government has certain rights in this invention.

BACKGROUND

The present invention relates to nosecone assemblies for gas turbine engines, and more particularly to baffles for use with gas turbine engine nosecone assemblies.

Gas turbine engines, such as those for aerospace applications, generally include a nosecone. The nosecone can be static (i.e., non-rotating) or rotating. Nosecones are frequently attached to supporting structures of the gas turbine engine by way of bolts in order to facilitate removal of the nosecone for repair and maintenance. However, it is desirable to not have fasteners extending into a flowpath at the nosecone.

The present invention provides an alternative configuration for a nosecone bolt access and aerodynamic leakage baffle.

SUMMARY

A device includes a resilient member having a first end for blocking an access hole and a second end for attachment to a support surface, an opening extending through the resilient member and located between the first and second ends, and a bolt connection location positioned at the second end of the resilient member. The first end of the resilient member blocks the access hole and can be deflected to provide tool access to the bolt connection location through the first opening.

DETAILED DESCRIPTION

Figure 1:
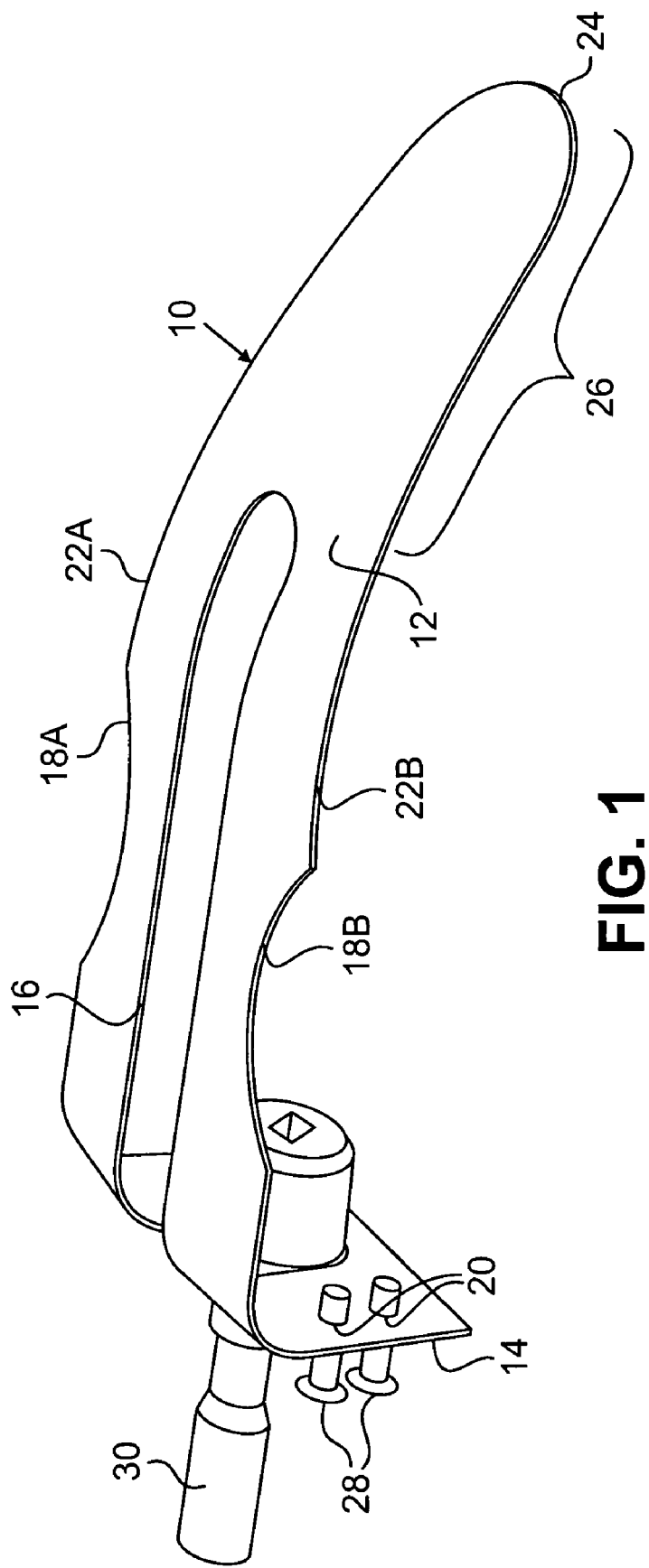
FIG. 1 is a perspective view of a baffle according to the present invention.

FIG. 1 is a perspective view of a baffle (or device) 10 for use with a gas turbine engine nosecone. In the illustrated embodiment, the baffle 10 includes an elongate extension 12, a flange portion 14, an elongate access opening 16, a pair of scallops 18A and 18B, and four fastener openings 20 (only two being visible in FIG. 1). The baffle 10 can be formed of a metallic material, such as stainless steel, a composite material, such as reinforced carbon fiber, etc.

The elongate extension 12 extends from the flange portion 14, and can be integrally formed with the flange portion 14. The elongate extension 12 defines opposed lateral edges 22A and 22B and a radiused distal end 24. The distal end 24 is located opposite the flange portion 14. The elongate access opening 16 extends through both the elongate extension 12 and through the flange portion 14, and is positioned approximately midway between the opposed lateral edges 22A and 22B of the elongate extension 12. The elongate access opening 16 has a width sufficient to accommodate tooling (e.g., a wrench) inserted therethrough. A bolt access seal portion 26 of the baffle 10 is defined between the distal end 34 and the elongate access opening 16 in a curved portion of the elongate extension 12.

The pair of scallops 18A and 18B are located along the lateral edges 22A and 22B, respectively, of the elongate extension 12, and can be posited adjacent to the elongate opening 16. In the illustrated embodiment, both of the scallops 18A and 18B have an identical radiused configuration and are located in a non-curved portion of the elongate extension 12. A width of the elongate extension 12 is reduced between the scallops 18A and 18B. The scallops 18A and 18B are configured to help control a stiffness of the elongate extension 12 of the baffle 10, as explained further below. The particular configuration of the scallops 18A and 18B can be selected to provide suitable stiffness for a given application.

The fastener openings 20 allow rivets 28 or other suitable fasteners (e.g., screws, bolts) to secure the baffle 10 to a nosecone at the flange portion 14. The fastener openings 20 can be arranged with two openings on either side of the access opening 16. In further embodiments, the number of fastener openings 20 and their arrangement can vary as desired for particular applications. A bolt 30 is positioned at a bolt connection location on the flange portion 14 between the two pairs of the fastener openings 20. The bolt 30 can extend through the access opening 16 at the flange portion 14, in other words, the bolt connection location can be defined as a portion of the access opening 16.

Figure 2:
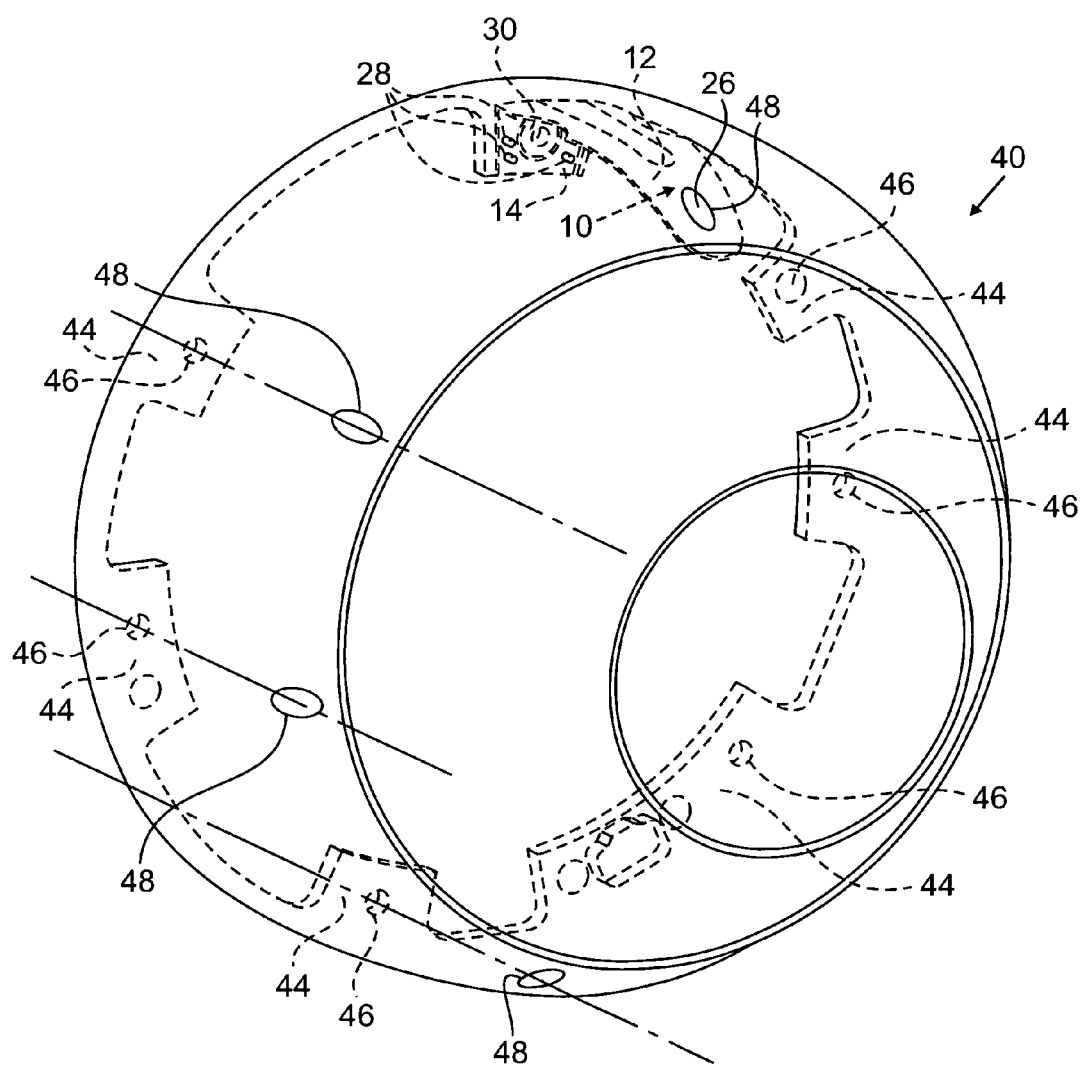
FIG. 2 is a perspective view of the baffle of FIG. 1 installed on a gas turbine engine nosecone.

FIG. 2 is a perspective view of the baffle 10 installed on a gas turbine engine nosecone 40. The nosecone 40 includes a body 42, a plurality of mounting flanges 44 each having a bolt hole 46, and a plurality of openings 48 in the body 42. It should be noted that not all of the bolt holes 46 and openings 48 are visible in FIG. 2. The nosecone 40 can be formed of a moldable composite material, a metallic material, or other suitable materials.

The body 42 defines an aerodynamic shape of the nosecone 40, which can vary as desired for particular applications. An exterior surface of the body 42 is a boundary surface for a flowpath of air entering an annular inlet of a gas turbine engine to which the nosecone 40 is attached. The mounting flanges 44 are located at an aft circumferential edge of the body 42, and extend radially inward toward an interior cavity defined by the body 42. A bolt hole 46 is provided through each mounting flange 44 in order to provide attachment points for removably securing the nosecone 40 to an engine with bolts or other suitable fasteners. The mounting flanges 44 can be formed integrally with the body 42 of the nosecone 40. In the illustrated embodiment, seven circumferentially spaced mounting flanges 44 are provided, though the number and arrangement of the mounting flanges 44 can vary in further embodiments.

The openings 48 are provided through the body 42 of the nosecone 40 at locations circumferentially or azimuthally aligned with each of the bolt holes 46 in the flanges 44. More particularly, the openings 48 are aligned (i.e., coaxial) with a central axis of each corresponding bolt hole 46 (a number of exemplary axes are shown in FIG. 2 for illustrative purposes). The openings 48 provide access through the body 42 of the nosecone 40 for tooling (e.g., a wrench) to tighten or loosen bolts 30 through the bolt holes 46, for attaching or removing the nosecone 40 relative to an engine.

The baffle 10 is connected to one of the flanges 44 by the rivets 28 such that the elongate extension 12 of the baffle 10 is positioned along an interior surface of the cavity defined by the body 42 of the nosecone 40. The elongate extension 12 and the flange portion 14 of the baffle 10 meet adjacent to the interior surface of the nosecone 40. The elongate extension 12 of the baffle 10 includes at least a portion near the distal end 24 with a curvature that corresponds to an aerodynamic curvature of the body 42 of the nosecone 40, and more particularly to a curvature of the interior surface of the body 42 of the nosecone 40. Stiffness of the baffle 10 keeps the elongate extension 12 in contact with the interior surface of the body 42 of the nosecone 40 by default.

The bolt access seal portion 26 on the elongate extension 12 of the baffle 10 is positioned at the corresponding opening 48 in the body 42 of the nosecone 40. The bolt access seal portion 26 is configured to have a surface area at least as large as an exposed area of the opening 48. In this way, the bolt access seal portion 26 covers and aerodynamically seals the opening 48 to create a positive and negative pressure seal in order to limit the entry of air and ice into the cavity of the nosecone 40 during engine operation. In order to maintain aerodynamic sealing of the opening 48, the baffle 10 should have sufficient stiffness, which is determined as a function of baffle materials and baffle geometry (including configuration of the scallops 18A and 18B). In the event of liberation of a component within the cavity of the nosecone 40, such as liberation of a bolt 30, coverage and sealing of the opening 48 by the bolt access seal portion 26 of the baffle 10 also helps prevent such a liberated object from exiting the cavity and being ingested by the engine, thereby reducing a risk of domestic object damage (DOD) to engine components. In other words, the baffle 10 helps protect the engine by trapping liberated objects within the cavity of the nosecone 40 until the liberated objects can be removed by maintenance personnel.

Although only one baffle 10 is shown in FIG. 2, one baffle 10 would generally be provided for each opening 48 in the body 42 of the nosecone 40.

Figure 3:
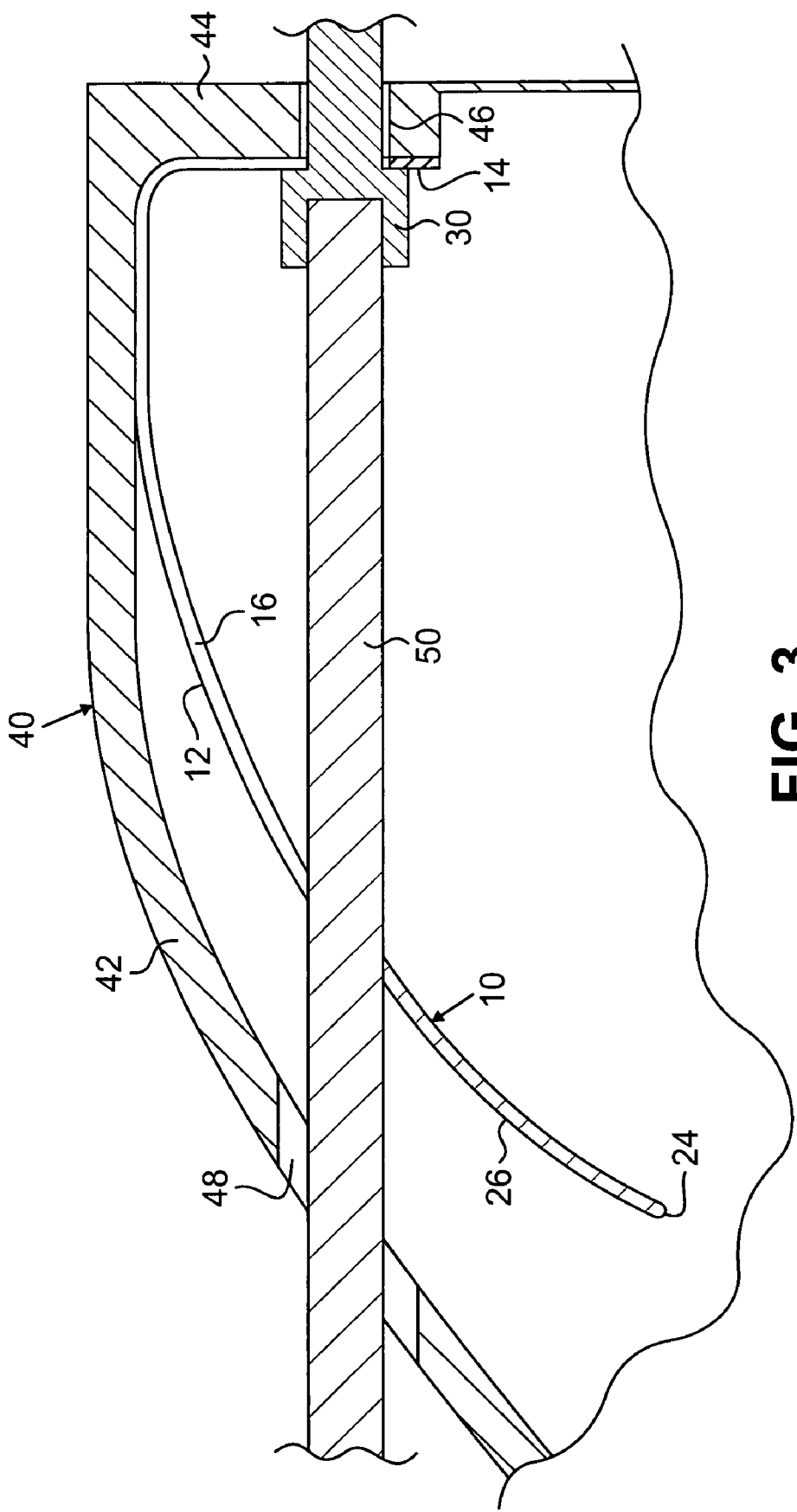
FIG. 3 is a cross-sectional view of the gas turbine engine nosecone and baffle with a tool inserted into the nosecone.

FIG. 3 is a cross-sectional view of the baffle 10 installed on the gas turbine engine nosecone 40, showing a tool 50 (e.g., a wrench for a Robertson, hex/Allen, Triple Square/XZN or other bolt drive) inserted into one of the openings 48 in the body 42 of the nosecone 40. As shown in FIG. 3, the elongate extension 12 of the baffle 10 is resiliently deflected by the tool 50, and the tool 50 extends through the elongate access opening 16 to engage the bolt 30 at the flange portions 14 and 46 of the baffle 10 and nosecone 40, respectively. The amount of deflection of the baffle 10 is a function of the stiffness provided by the scallops 18A and 18B (not visible in FIG. 3) and the material from which the baffle 10 is made, as well as the location of the elongate access opening 16. When the tool 50 is initially inserted through the opening 48 in the nosecone 40, the tool 50 contacts the bolt access seal portion 26 of the baffle 10. Force applied at the seal portion 26 by the tool 50 causes the elongate extension 12 of the baffle 10 to deflect. Continued application of force with the tool 50 causes the tool 50 to slide along the elongate extension 12 until passing through the elongate access opening 16 and reaching the bolt 30. Withdrawal of the tool 50 causes the baffle 10 to return to its original position with the bolt access seal portion 26 covering the opening 48 in the nosecone 20.

It should be recognized that the present invention provides numerous advantages. For instance, the elongate access opening of the baffle allows tool access to a cavity within a nosecone with relatively little deflection of the baffle, which allows the baffle to have a relatively high stiffness to provide sealing of openings in the nosecone during engine operation and also to enhance baffle lifespan by limiting fatigue. Stiffness of the baffle can be especially important when utilized with a static (i.e., non-rotating) nosecone, where there is no centrifugal action to help maintain sealing of nosecone openings.

Although the present invention has been described with reference to preferred embodiments, workers skilled in the art will recognize that changes may be made in form and detail without departing from the spirit and scope of the invention. For instance, the dimensions and proportions of the baffle can vary as desired for particular applications.

What is claimed is:

1. A device comprising:
   a resilient member having a first end for blocking an access hole and a second end for attachment to a support surface, wherein the resilient member also has opposite first and second surfaces that each extend between the first and second ends;
   a first opening extending through the resilient member between the first and second surfaces and located between the first and second ends; and
   a bolt connection location positioned at the second end of the resilient member, wherein the first end of the resilient member blocks the access hole and can be deflected to provide access to the bolt connection location through the first opening.

2. The device of claim 1 and further comprising:
   a plurality of fasteners located at the second end of the resilient member and adjacent to the bolt connection location for attaching the resilient member to the support surface.

3. The device of claim 1 and further comprising:
   a pair of scallops located along opposed lateral edges of the resilient member, wherein shape of the scallops determines the resiliency of the device.

4. The device of claim 1, the resilient member further comprising:
   a bolt access seal portion located between the first end of the resilient member and the first opening.

5. The device of claim 1, wherein the resilient member comprises a metallic material.

6. An assembly comprising:
   a bolt; and
   a device comprising:
      an elongated first member formed such that it corresponds with an interior surface of a gas turbine nosecone;
      a second member extending from the first member;
      a first opening extending through both the first and second member; and
      at least one fastener opening located in the second member,
      wherein the first member seals an access hole on the nosecone and can be resiliently deflected to provide access through the first opening to a fastener that secures the nosecone to the gas turbine.

7. The assembly of claim 6, wherein four fastener openings are located in the second member.

8. The assembly of claim 6 and further comprising:
   a pair of arcuate scallops located along opposed lateral edges of the first member, wherein the shape of the scallop determines the resiliency of the device.

9. The assembly of claim 6, the first member further comprising:
   a bolt access seal portion located between a distal end of the first member and the first opening.

10. The assembly of claim 6, wherein the baffle comprises a material selected form the group consisting of a metallic material and a composite material.

11. The assembly of claim 10, wherein the device comprises stainless steel.

12. An assembly comprising:
a bolt;
a nosecone comprising:
   a body defining an interior surface;
   a mounting flange extending from the body for securing the nosecone to a supporting structure with the bolt; and
   an opening in the body, wherein the opening is circumferentially aligned with the flange; and
a device positioned at the opening in the body of the nosecone, the device comprising:
   an elongated first member formed such that it corresponds with the interior surface of a gas turbine nosecone;
   a second member extending from the first member;
   a first opening extending through both the first and second member; and
   at least one fastener opening located in the second member,
   wherein the first member seals the opening in the body of the nosecone and can be resiliently deflected to provide access through the first opening to the bolt that secures the nosecone to the gas turbine.

13. The assembly of claim 12, wherein the at least one fastener comprises a rivet located adjacent to the bolt.

14. The assembly of claim 12, wherein four fasteners secure the second member of the device to the flange of the nosecone.

15. The assembly of claim 12, the device further comprising:
   a pair of scallops located along opposed lateral edges of the first member, wherein the shape of the scallop determines the resiliency of the device.

16. The assembly of claim 12, the elongate portion of the device further comprising:
   a bolt access seal portion located between a distal end of the first member and the first opening.

17. The assembly of claim 12, wherein the device comprises a metallic material.

18. The assembly of claim 12, wherein at least the body of the nosecone comprises a composite material.

19. A device comprising:
   a resilient member having a first end for blocking an access hole and a second end for attachment to a support surface;
   a first opening extending through the resilient member and located between the first and second ends;
   a pair of scallops located along opposed lateral edges of the resilient member, wherein shape of the scallops determines the resiliency of the device; and
   a bolt connection location positioned at the second end of the resilient member, wherein the first end of the resilient member blocks the access hole and can be deflected to provide access to the bolt connection location through the first opening.

20. The device of claim 19, wherein the first opening traverses a bent region of the resilient member.

* * * * *